US008316803B2

(12) United States Patent
Turner

(10) Patent No.: US 8,316,803 B2
(45) Date of Patent: Nov. 27, 2012

(54) PET DOOR HOOD

(76) Inventor: Robert Chase Turner, Redmond, WA (US)

( * ) Notice: Subject to any disclaimer, the term of this patent is extended or adjusted under 35 U.S.C. 154(b) by 0 days.

(21) Appl. No.: 12/774,664

(22) Filed: May 5, 2010

(65) Prior Publication Data

US 2010/0282181 A1 Nov. 11, 2010

Related U.S. Application Data

(62) Division of application No. 11/004,018, filed on Dec. 3, 2004, now abandoned.

(51) Int. Cl.
*A01K 1/035* (2006.01)

(52) U.S. Cl. ........................................ 119/484; D30/119

(58) Field of Classification Search .................. 119/484, 119/469; 49/169, 71; D30/108, 199, 119
See application file for complete search history.

(56) References Cited

U.S. PATENT DOCUMENTS

| | | | | | |
|---|---|---|---|---|---|
| 2,097,704 | A | * | 11/1937 | Smith | 160/81 |
| 3,091,221 | A | * | 5/1963 | Worm | 119/484 |
| 3,741,275 | A | * | 6/1973 | Greenspan | 160/58.1 |
| 3,978,616 | A | * | 9/1976 | Pennock | 49/386 |
| 4,224,889 | A | * | 9/1980 | Spiegel | 114/291 |
| 4,224,899 | A | | 9/1980 | Cruchelow | |
| 6,297,739 | B1 | | 10/2001 | Small | |
| 6,385,909 | B1 | | 5/2002 | Marsh | |
| 6,433,692 | B1 | | 8/2002 | Kenum | |
| 6,453,847 | B2 | | 9/2002 | Brooks | |
| 6,560,926 | B1 | | 5/2003 | Gillett | |
| 6,681,524 | B1 | * | 1/2004 | Tillson | 49/169 |
| 6,691,463 | B1 | | 2/2004 | Richmond | |
| 6,691,483 | B2 | | 2/2004 | Lethers | |
| 6,725,806 | B1 | | 4/2004 | Gribble | |
| D499,515 | S | * | 12/2004 | Schulze et al. | D30/119 |
| D518,926 | S | * | 4/2006 | Grundy | D30/119 |
| 7,886,486 | B2 | * | 2/2011 | Lomax et al. | 49/169 |
| 2005/0050833 | A1 | | 3/2005 | Spray | |

* cited by examiner

*Primary Examiner* — Kristen C Hayes
(74) *Attorney, Agent, or Firm* — Launchpad IP, Inc.; Christopher A. Wiklof

(57) ABSTRACT

A pet door hood is adapted to partially enclose the exterior and/or interior of a pet door or other animal access opening. The pet door hood may be formed to protect the pet door from weather, from entry by stray animals, and/or from entry or access by humans. The pet door hood may be formed integrally with a pet door or optionally integrally with a panel having a pet door. Optionally, the pet door hood may be formed separately from the pet door or aperture, or panel having a pet door therein The pet door hood may be adapted for assembly with a pet door or aperture.

14 Claims, 6 Drawing Sheets

PET DOOR HOOD

CROSS-REFERENCE TO RELATED APPLICATIONS

This application is a Divisional of and claims priority from U.S. application Ser. No. 11/004,018, filed Dec. 3, 2004, entitled "Pet Door Hood"; the contents of which are incorporated by reference herein.

FIELD OF THE INVENTION

The present invention relates to animal ingress/egress doors and openings, and more particularly to methods and apparatuses for protecting an animal door or opening from inclement weather and for preventing or deterring entrance to a building or other enclosure by human intruders or unwanted animals via an animal door or opening

BACKGROUND

Animal ingress/egress doors and openings are formed to allow the passage of one or more animals between partitioned spaces. As used herein, the term "pet" refers both to companion animals as well as working, livestock, zoo, or wild animals.

Pet openings are apparatuses that generally allow for the movement of animals between environments, such as between an indoor environment and the outdoors. Frequently, pet openings include a self-closing panel, such as a flap, that may be pushed open from either side by an animal. When the animal is indoors, it may exit by pushing its nose against the inner surface of a relatively free-swinging flap, causing the flap to swing outwards to allow the animal to pass its body between the out-swung flap and the lower edge of the door aperture. Similarly, an animal may enter a space by pushing its nose against the outer surface of the flap, causing the flap to swing inward and thus allowing the animal to pass between the in-swung flap and the lower edge of the door aperture.

The use of a pet door thus allows a pet to move back and forth between the inside of a residence, kennel, zoo enclosure, etc, and an outdoor space without intervention by the animal keeper or owner.

According to the prior art, a common theme has focused on improving weather-resistance of pet doors. Gribble U.S. Pat. No. 6,725,806, for example, discloses a "resiliently flexible seal" that is mounted around the pet door to prevent the intrusion of drafts. Gribble further discloses a latch for latching the U.S. Pat. No. 6,681,524 to Tillson discloses a "door within a door" that allows two-way access while creating seals between the doors and their respective frames that are secured by the weight of the door (and door plus frame) being supported at a non-vertical angle.

Other prior art has focused on improving the security of pet doors. For example, U.S. Pat. No. 6,691,463 to Richmond discloses a sliding kennel door apparatus that may be remotely raised to open by manual, electrical, hydraulic, or pneumatic means. Gillett, U.S. Pat. No. 6,560,926 discloses a pet door having an opening mechanism that includes a receiver and portable transmitter. Kenum, U.S. Pat. No. 6,433,692 discloses a signaling mechanism that allows a trained pet to "ring a doorbell" to request entry. Small, U.S. Pat. No. 6,297,739 discloses a rather complicated system that interrogates an identification device carried by authorized animals and unlocks the pet door in response to the presence of the authorized animal. This is combined with a weight sensor that discriminates between the weight of authorized and unauthorized animals Marsh et al., U.S. Pat. No. 6,385,909 discloses a rather simpler pet door that includes a sliding lock mechanism that allows the owner to determine whether or not to allow access. Brooks, U.S. Pat. No. 6,453,847 discloses an electro-magnetically actuated door that is released to open by a magnet carried by the authorized animal.

Still other pieces of prior art pertain to pet door security covers that may be installed to prevent intrusion by keeping a pet door closed.

Additionally, a certain amount of attention has been paid to creation of a pet door that may be installed in an existing opening, such as a window, without necessitating the substantially non-reversible cutting of an aperture. For example, U.S. Pat. No. 6,691,483 to Lethers discloses a panel that may be installed in an existing sliding glass door opening.

There remains a need to provide a simple apparatus that affords security while allowing operation of the pet door. There remains a need to provide an apparatus that affords a measure of weather protection while allowing operation of the pet door and without requiring tight seals that hinder motion of a pet door. There further remains a need for a simple apparatus that reduces or eliminates the entry of unwanted animals but without the need to train pets or otherwise provide expensive identification devices.

OVERVIEW

One aspect according to the disclosure relates a hood or cover that may be used to protect an animal access door or opening. An exemplary embodiment forms an awning-like protuberance positioned exterior to a pet door.

According to another aspect, a protective cover may be formed integrally to an animal door. Such an assembly may be formed in a joined manner during manufacture for subsequent installation as a unit.

According to another aspect, a separate animal door and protective cover may be offered for sale as a kit for installation together.

According to another aspect, a human access door includes a protected animal access means.

According to another aspect a protective cover provides sheltered access by small animals and prevents access by larger animals. Such an embodiment may be used, for example, in a kennel, coop, corral, fenced yard, etc to provide areas for small animal refuge, while preventing access by larger animals that otherwise share the common space.

According to another aspect, an animal hood allows a small animal to exit and reenter a confined space while preventing escape of a larger animal from confinement. Such a use may, for example, allow a cat to exit and reenter a house while keeping a dog confined to the house.

According to another aspect, a protective cover substantially prevents weather such as wind, rain, snow, etc from intruding into a space through an animal door.

According to another aspect, a protective cover effectively creates a form of airlock that helps retain heat when an animal exits or enters through an animal access port.

According to another aspect, a lip may be formed on a lower aperture-adjacent edge to reduce the intrusion of snakes.

These and other aspects will become clear from the drawings, specification, and claims hereof.

DETAILED DESCRIPTION

The following discussion is presented to enable a person skilled in the art to make and use the invention. The general principles described herein may be applied to embodiments and applications other than those detailed below without departing from the spirit and scope. Therefore the present invention is not intended to be limited to the embodiments shown, but is to be accorded the widest scope consistent with the principles and features disclosed or suggested herein.

As used herein, the term "pet door" is frequently used to refer either to an open aperture through which an animal may pass and/or to an aperture for animal passage having an opening and closing member functionally associated therewith. In some cases, the term "flap" is used to refer to an opening and closing member associated with the animal passage. It will be understood that alternative structures may be substituted without departing from the spirit and scope.

Figure 1:
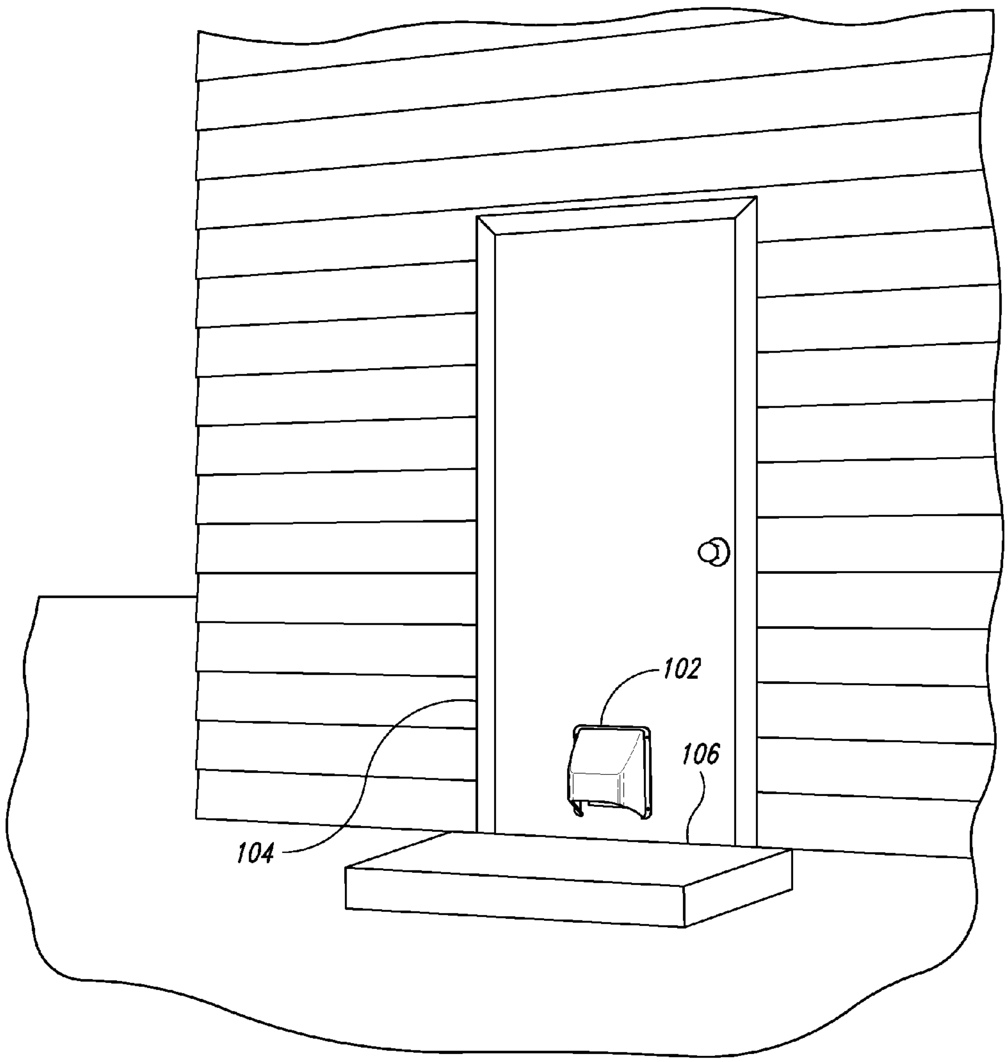
FIG. 1 is a perspective view illustrating an exemplary pet door hood installed in or integral to a panel.

FIG. 1 illustrates an exemplary embodiment of a pet door hood 102 on the exterior surface of a panel 104. According to the exemplary embodiment, panel 104 may be a door onto which a pet door hood may be attached. Alternatively, a pet door hood 102 may be formed integral to a panel. Such a panel may include a door or alternatively another type of panel that can fit, for example, into an existing opening such as a sliding glass door opening or wall opening.

Figure 2:
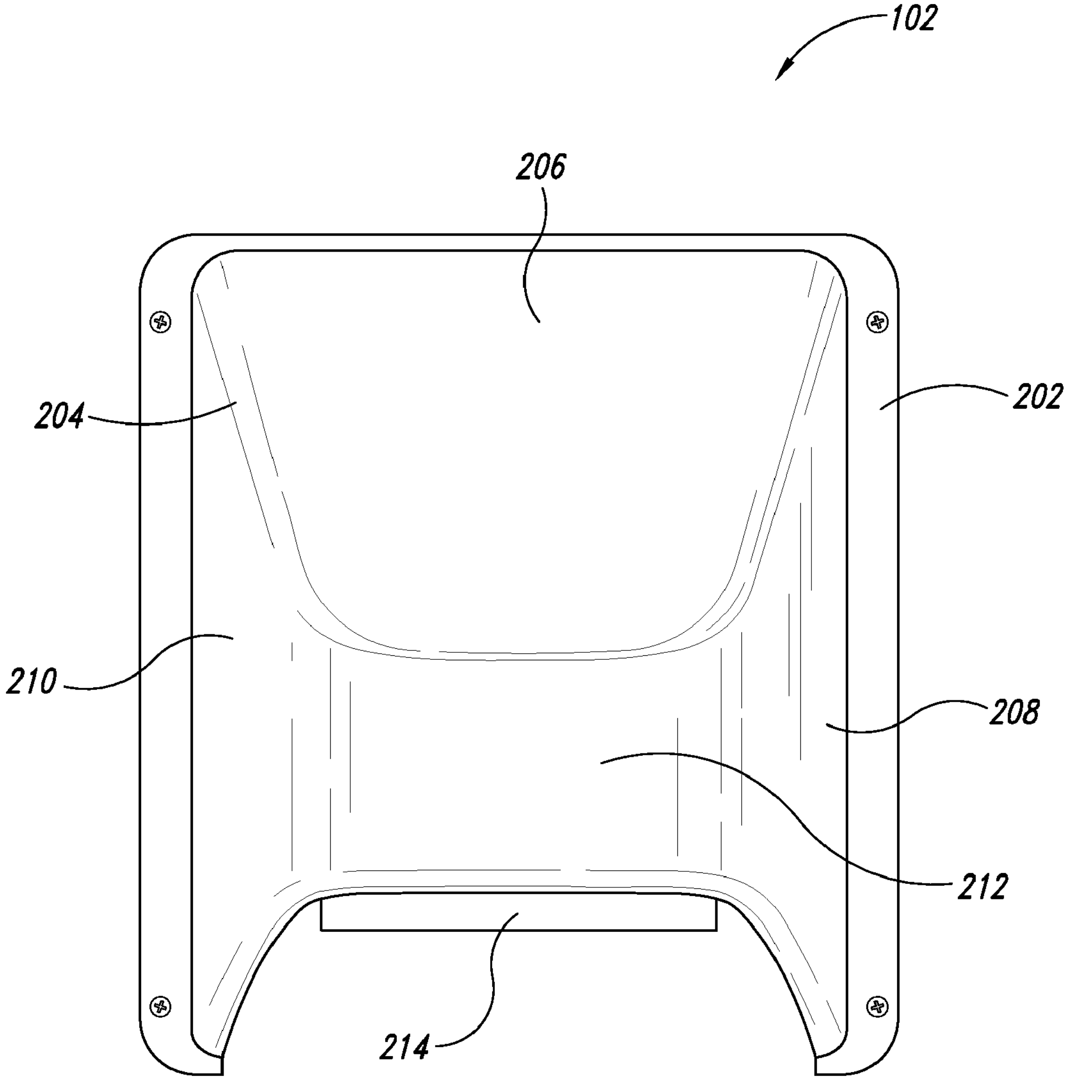
FIG. 2 is a front view of the pet door hood of FIG. 1.

FIG. 2 shows a frontal close-up view of pet door hood 102. The pet door hood 102 includes a mount 202, here embodied as a flange, mounted to the panel 104 at a position peripheral to an aperture 214 formed in the panel near its lower edge. A wall member, also referred to as a shell, 204 extends exteriorly from the mount 202 to partially enclose a volume exterior to the aperture 214. According to the exemplary embodiment, the wall member 204 includes a sloped upper surface 206 and two respective side surfaces 208 and 210. The upper surface 206 and side surfaces 208 and 210 support a front surface 212 that cooperates with other portions of the wall member to extend downward to block access to at least a portion of the aperture 214 from a direction normal to the surface of the panel 104. The side surfaces 208, 210 and front surface 212 of the wall member cooperate with the panel 104 to define an open bottom through which a relatively small animal may pass on its way to and from the aperture 214.

To ingress through the aperture, the relatively small animal typically ducks under the front surface 212 and extends its head up into a passage volume defined by the wall member 204 and panel 104. According to some embodiments, aperture 214 may be equipped with a door or flap (not visible in FIGS. 1 and 2) that closes when an animal is not passing through the aperture. For this case, the animal proceeds through the passage volume by pushing its nose against the door, which may be a conventional flap-type animal door, causing the flap to swing inward. The animal subsequently proceeds into the interior of the structure and the animal door closes behind the animal.

To egress through the aperture, the relatively small animal pushes its nose against the flap-type animal door (not shown), causing it to swing in an outward arcuate path into the volume defined by the wall member 204. The relatively small animal then passes through the aperture 214, through the volume defined by the wall member 204, downward through the open bottom defined by the side surfaces 208, 210, front surface 212, and panel 104, and out into the exterior space.

In contrast, the pet door hood 102 prevents access to the pet door by larger animals owing to the proximity of the lower edges of the side surfaces 208, 210 and front surface 212 to the lower edge of panel 104, and hence to a horizontal surface therebelow, exemplified by the landing surface 106 shown in FIG. 1. Larger animals may be too large to fit between the lower edge of the wall member 204 and the horizontal surface 116. Alternatively, a larger animal may be blocked by inability to bend its body through the relatively labyrinthine path defined by the walls 208, 210, 212 and top 206 of the wall member 204 in cooperation with the floor surface 116 and enclosed aperture 214 in panel 104.

According to optional embodiments, the mount 202 may be formed integrally or separately from wall member 204. When formed separately, wall member may be permanently or semi-permanently affixed to mount 202. Alternatively, wall member 204 and mount 202 may be formed with features that allow removal of wall member 204 from panel 104 without also requiring removal of mount 202. Such features may include a range of fastening technologies as is known to the art.

Mount 202 may be affixed to a panel through a variety of techniques known to one skilled in the art. Such techniques extend to fasteners, adhesives, hook-and-loop, magnetic, soldering, welding, interference fit, and other permanent, semi-permanent, or non-permanent means.

The surfaces of wall member 204, for instance surfaces 206, 208, 210, and 212, as shown in FIG. 2, may be varied considerably from the form illustrated in that and other figures. For example, the surfaces of wall member 204 may be made effectively continuous by forming them from curves that gradually transition, one into another, without clear demarcation therebetween. According to another example, top surface 206 may be formed to be substantially horizontal, may be split into a plurality of facets, or may be formed in other alternative shapes. One or more of the surfaces illustrated may be eliminated altogether, while retaining the functional aspects described herein and/or apparent to one skilled in the art.

While the example of FIG. 2 illustrates the surfaces 206, 208, 210, and 212 of wall member 206 as being formed monolithically, that is, from a single piece of material, such surfaces may alternatively be formed as two or more separate pieces that may be assembled to form a joined wall member 206.

As illustrated, one or both of wall member 206 and frame 202 may be formed monolithically using methods and materials known to the art, including but not limited to injection molded plastic, thermoformed plastic, reaction-injection-molded (RIM) plastic, stamped metal or plastic, extruded metal or plastic, spin-cast plastic, bulk wood, pressure-formed wood, injection molded rubber, drawn plastic or metal, cast metal, molded foam, fiberboard, fiberglass, cloth-and-frame, or other methods as will be apparent to one skilled in the art.

Wall member 206 and/or portions thereof may be formed to be opaque, translucent, or transparent, as may be preferred. It may be painted, decaled, brushed, embossed, metallized, mirrored, formed of colored material, textured, or otherwise decorated or outfitted with a functional or decorative surface treatment as will be appreciated by one skilled in the art.

It may be further appreciated that the pet door hood 102 may be formed to prevent the impingement of adverse weather such as wind, rain, snow, sleet, etc. upon the aperture 214. Pet door hood 102 can further prevent or dissuade the entry or access of a human through the aperture, which may be an issue with apertures sized for larger animals.

In addition or optionally to physically blocking access by larger animals, the pet door hood may psychologically block entry of even relatively small animals owing to reticence of unfamiliar animals to enter the enclosed volume of the pet hood.

Figure 3:
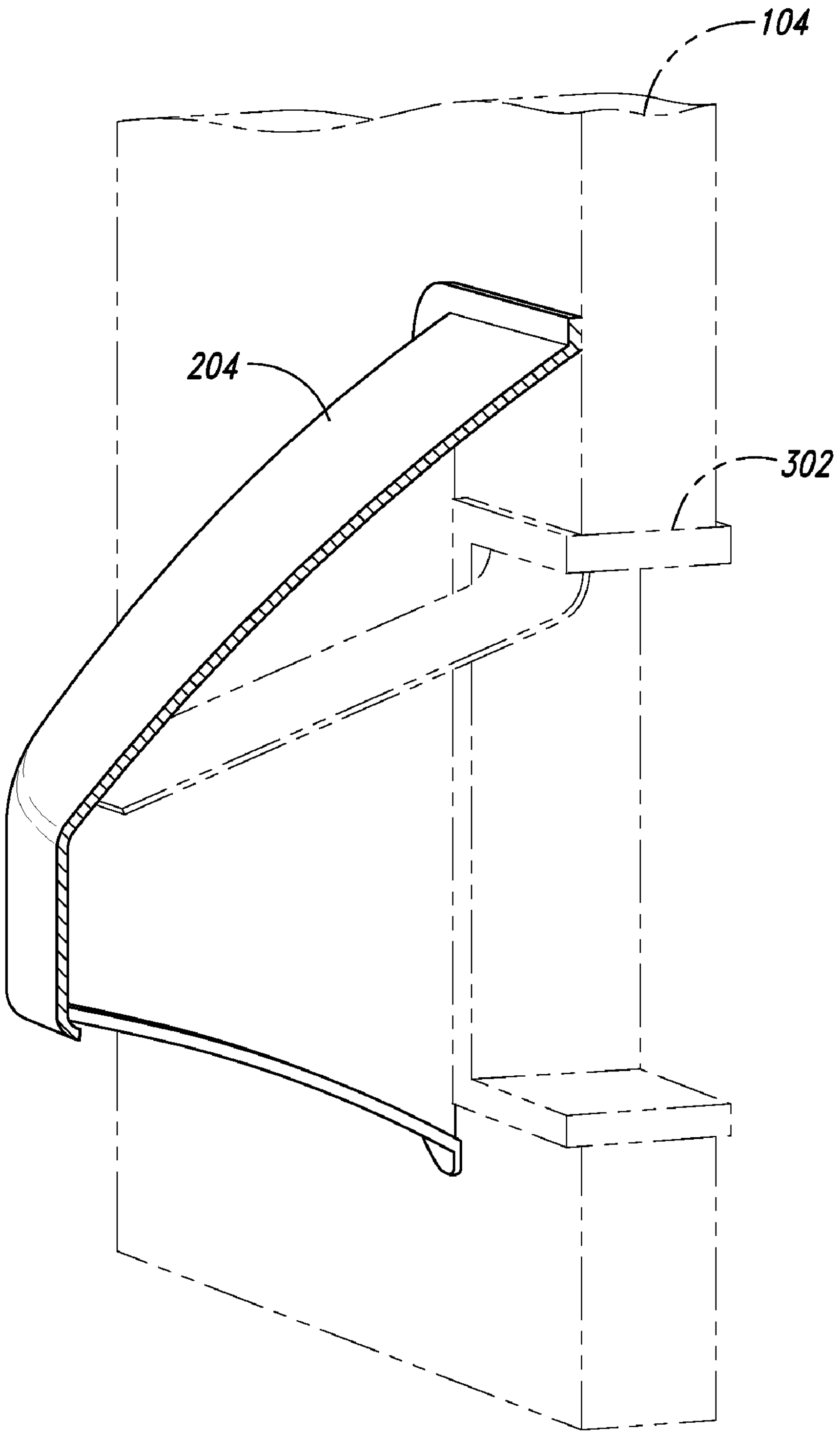
FIG. 3 is a side perspective view with portions removed installed over a pet door.

FIG. 3 is a perspective view of a section of a first exemplary embodiment of the pet door hood of FIGS. 1 and 2 Half of the hood or wall member 204, the conventional pet door, and the panel 104 have been cut away for ease of understanding. As indicated by the solid and dashed lines, FIG. 3 represents an embodiment where a wall member 204 is affixed to an existing panel 104. Existing panel 104 has installed therein a conventional flap-type pet door 302. As can be seen, wall member 204 is sized and positioned to allow the flap of the conventional flap-type pet door 302 to swing into a volume defined by the wall member 204, and yet at least partially block access to portions of the conventional pet door 302 from an exterior direction normal thereto.

Figure 4:
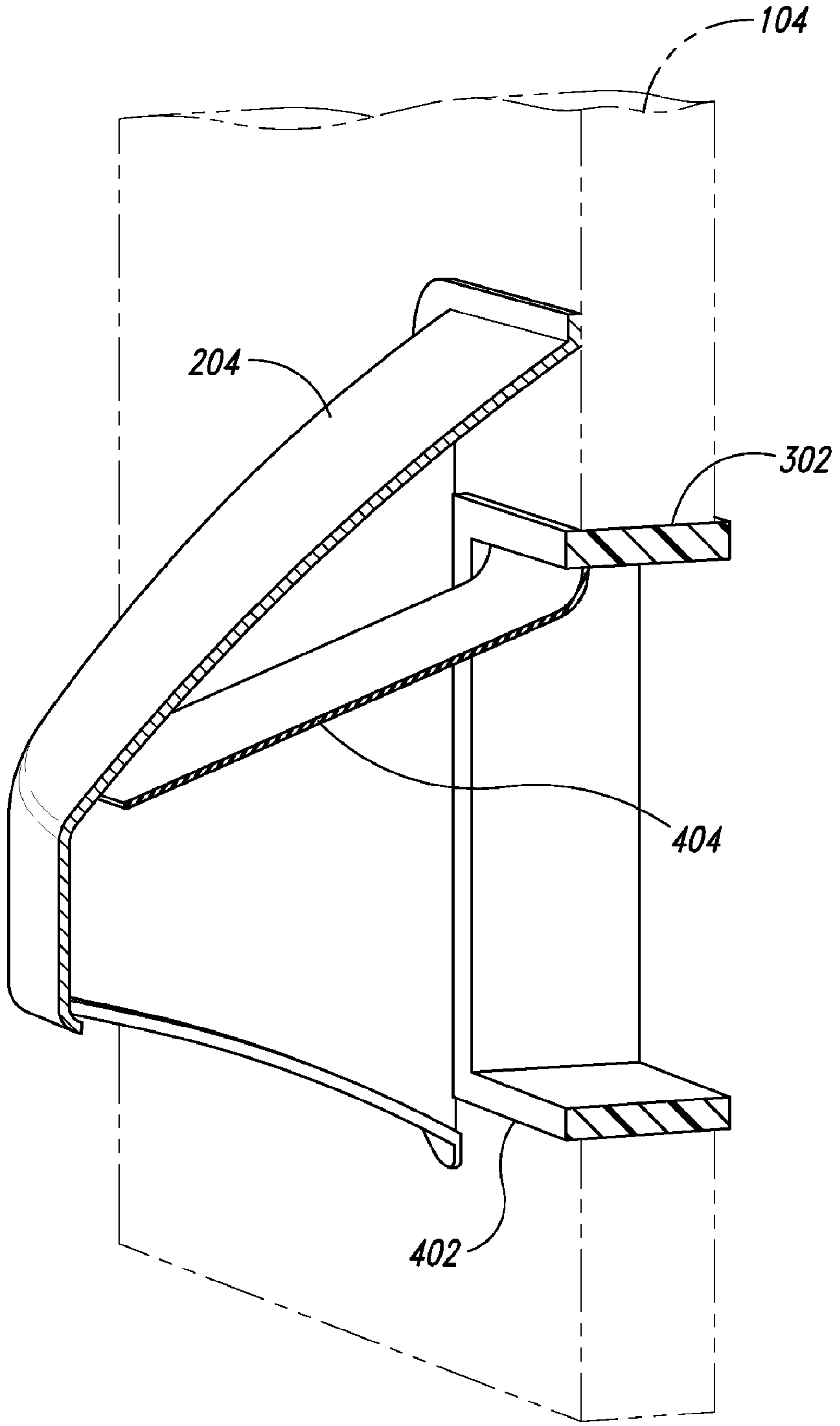
FIG. 4 is a side perspective view with portions removed of a pet door with integral hood.

FIG. 4 illustrates a perspective view of section of an alternative embodiment wherein the "hood" or wall member 204 is formed integrally or detachably with a pet door 302. The assembly includes a frame 402 that is installed in the aperture of a panel 104, such as a door. A swinging flap-type pet door 404 is mounted to the frame 402 at its upper edge such that gravity holds the flap in place when no animal is proceeding therethrough. Alternatively, another type of door 404 may be used, including but not limited to a magnetically-sealable door, a hydraulically or pneumatically operable door, a lever-operated door, etc.

Door frame 402 may optionally be formed as one piece with hood wall 204, or optionally may be a separate piece. The separate pieces may be independently fastenable to panel 104, or alternatively may mount to panel 104 using a common mounting feature Hood or wall member 204 may optionally be made removable. The hood or wall member 204 may include mating or latching features for removable affixing to the frame 402 or an alternate frame.

The lower sill of frame 402 may optionally include or have installed therewith a "snake repeller" (not shown). As is known to the art, a length of cylindrical material such as garden hose material may be affixed to the lower sill of a conventional pet door to dissuade the entry of a snake therethrough. Such a snake repeller may be formed integrally to the lower sill of frame 402 or optionally may be affixable thereto.

Figure 5:
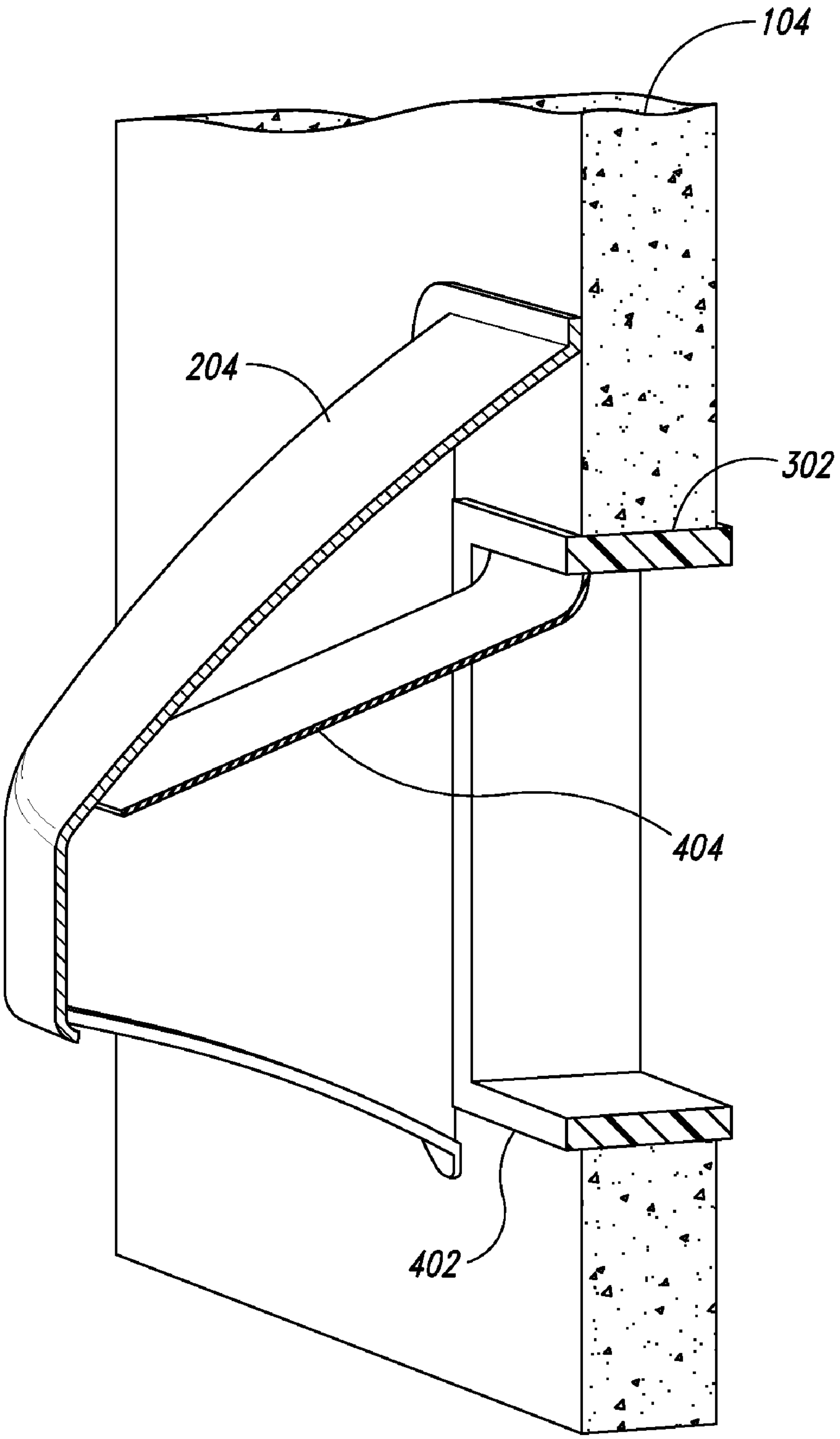
FIG. 5 is a side perspective view with portions removed of a panel or door with protected pet access.

FIG. 5 illustrates a perspective view of a section of an alternative embodiment wherein a hood or wall member 204, a pet door 302, and a panel 104 are formed integrally or detachably. The panel may, for example, be a door (optionally pre-mounted in a door jamb), a panel for mounting in a sliding door or sliding window opening, a garage door or garage door panel, or other panel that may be conveniently installed.

Figure 6:
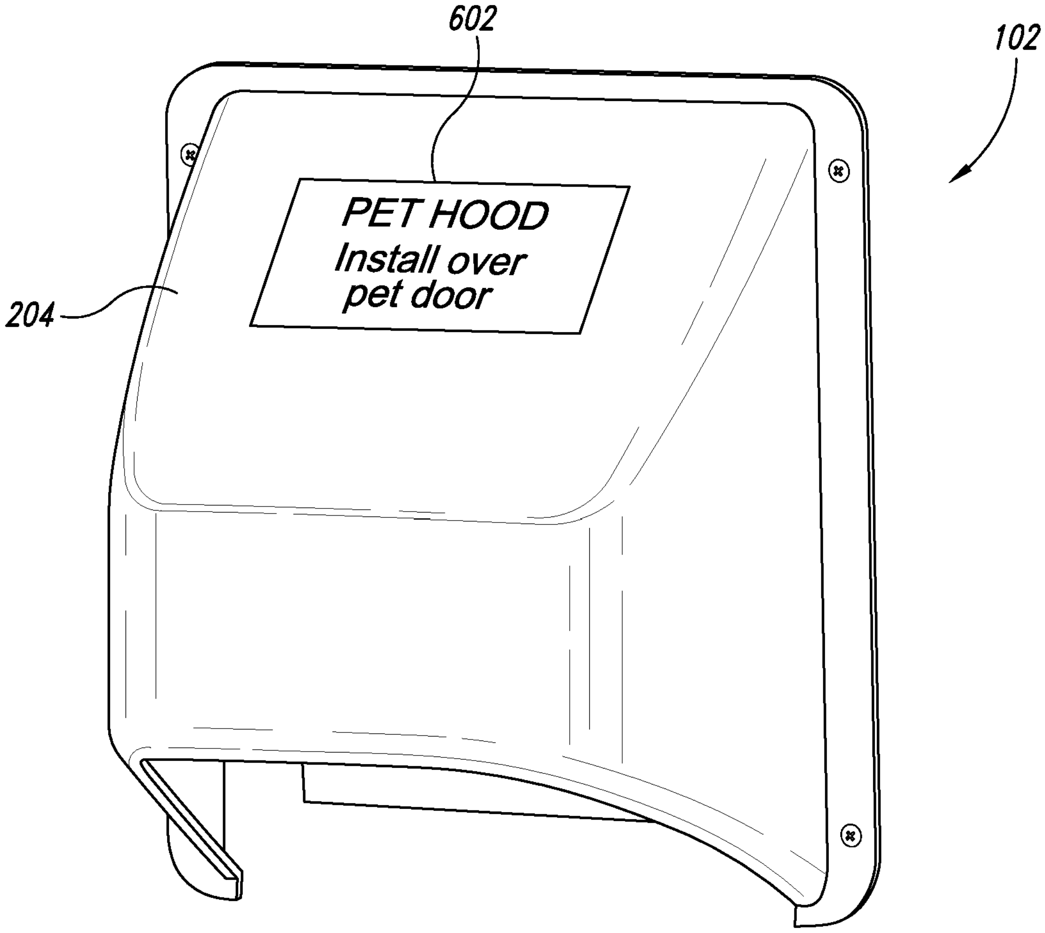
FIG. 6 is a diagram of a pet door hood adapted to retail sale.

FIG. 6 illustrates a pet door hood according to a configuration prepared or offered for retail sale. As illustrated in the example of FIG. 6, wall member 204 has attached thereto a label 602. Label 602 includes indicia for designating the use or purpose of wall member 204. For example, label 602 may include a designator "Pet Hood," and may include directions for mounting wall member 204, such as "Install over pet door." Additionally or alternatively, label 602 may include graphic images indicating the purpose and/or function, printed price, UPC or EAN bar code symbol for linking to a database having a description and price, etc. Label 602 may be embodied in alternative ways as is known to one skilled in the art. For example, pet hood 102 may include an outer box, blister pack, bag, or other container indicating the purpose, function, use, price, name or other information. In other examples, pet hood 102 may be placed on a shelf or display that includes such designation. Label 602 may alternatively be embodied as embossing, printing, etc. on the wall member 204. Label 602 may be embodied as a hang tag or other designator as will be known to one skilled in the art.

As an alternative to having a label 602 associated with a pet door hood 102, a pet door hood may include a batch of labels shipped with or separately but with instructions to associate a label with a pet door hood for retail sale. Alternatively, label 602 may be in the form of a non-physical label such as a web page. Label 602 and its equivalents may be referred to as informative indicia.

The preceding overview, brief description of the drawings, and detailed description describe exemplary embodiments according to the present invention in a manner intended to foster ease of understanding by the reader. Other structures, methods, and equivalents are within the scope of the invention. As such, the scope of the invention described herein shall be limited only by the claims.

What is claimed:

1. A pet door hood system, comprising:

a pet door including:

a frame defining a first rectangular aperture, the first rectangular aperture having a height and a width, the frame being configured to be inserted in a second rectangular aperture formed in a vertical panel separating an indoor volume from an outdoor volume; and a flap operatively coupled to the frame and operable to sequentially swing open and closed inward and outward through a substantially vertical plane defined by the first rectangular aperture; and a pet door hood including:

a mount configured to mount the pet door hood onto an external surface of the vertical panel peripheral to the first rectangular aperture, the mount including a top portion configured to mount above a top of the first rectangular aperture and two side portions configured to mount adjacent to sides of the first rectangular aperture, wherein the two side portions are defined by a vertical dimension greater than the height of the first rectangular aperture such that the two side portions extend beyond the top and a bottom of the first rectangular aperture; and a shell operatively coupled to and protruding outward from the mount, the shell including:

two shell sides configured to extend outward from the respective two side portions of the mount, such that the two shell sides extend beyond the top and the bottom of the first rectangular aperture at the respective two side portions of the mount;

a shell top configured to extend outwards from the top portion of the mount and across the top of the first rectangular aperture such that the shell top is contiguous with or coupled to the two shell sides; and a shell front contiguous with or coupled to the shell top and the two shell sides, the shell front having a height less than the height of the first rectangular aperture and the shell front being vertically located such that a bottom edge of the shell front is higher than the bottom of the first rectangular aperture, wherein the two shell sides extend downward from the bottom edge of the shell front to the respective two side portions of the mount;

wherein the shell sides, shell top, and shell front form a partially enclosed volume having an open bottom, the partially enclosed volume being sufficiently large to allow the flap to swing into the volume responsive to pressure from a pet passing through the first aperture to exit the indoor volume, and to allow the pet to pass through when entering the indoor volume.

2. The pet door hood system of claim 1 wherein the shell extends to prevent access to the first rectangular aperture from outside the shell along an axis normal to the plane defined by the first rectangular aperture.

3. The pet door hood system of claim 1, wherein the frame, the mount, and the shell are formed as a single contiguous part.

4. The pet door hood system of claim 1, wherein the mount further comprises a flange; and wherein the flange is contiguous with the shell.

5. The pet door hood system of claim 4, wherein the flange and the shell are formed as a single injection molded part.

6. The pet door hood system of claim 1, wherein the mount and the two shell sides are configured to extend along the entirety of the height of the sides of the first rectangular aperture.

7. The pet door hood system of claim 1, wherein:

the shell top extends down from the top portion of the mount to a top of the shell front; and the two shell sides each have respective top edges that are contiguous or coupled to the shell top and that extend outward and down from the respective two side portions of the mount to the shell front such that the shell top is slanted.

8. The pet door hood system of claim 1, wherein the partially enclosed volume is further configured to prevent access to the pet door by a second animal larger than the pet.

9. The pet door hood system of claim 1, wherein the shell is configured to substantially prevent adverse weather from impinging upon the pet door.

10. A pet door hood configured for mounting over a pet door having a height and width in a vertical panel separating an indoor volume from an outdoor volume, comprising:

a mount configured for attachment onto an external surface of the vertical panel peripheral to the pet door, the mount including a top portion configured to mount above a top of the pet door and two side portions configured to mount adjacent to sides of the pet door, wherein the two side portions are configured with a vertical dimension greater than the height of the pet door such that the two side portions of the mount extend beyond the top and a bottom of the pet door; and a shell operatively coupled to and protruding outward from the mount, the shell including:

two shell sides configured to extend outward from the respective two side portions of the mount, such that the two shell sides extend beyond the to and the bottom of the pet door at the respective two side portions of the mount;

a shell top configured to extend outwards from the to portion of the mount and across the width of the top of the pet door such that the shell top is contiguous with or coupled to the two shell sides; and a shell front contiguous with or coupled to the shell top and two shell sides, the shell front having a height less than the height of the pet door and the shell front being vertically located such that a bottom edge of the shell front is higher than the bottom of the pet door, wherein the two shell sides extend downward from the bottom edge of the shell front to the respective two side portions of the mount;

wherein the two shell sides, the shell top, and the shell front form a partially enclosed volume having an open bottom, the partially enclosed volume being sufficiently large to allow a pet to pass through the pet door to enter or exit the indoor volume.

11. The pet door hood of claim 10, wherein the mount is a flange.

12. The pet door hood of claim 11, wherein the flange is configured to be coupled to the vertical panel with screws.

13. The pet door hood of claim 10, wherein the shell and the mount are formed from a single injection molded plastic part.

14. The pet door hood of claim 10, wherein the shell is configured to prevent access to the pet door from the outdoor volume from directions equal to or above the height of the pet door.

* * * * *